United States Patent
Supina et al.

(10) Patent No.: US 7,572,201 B2
(45) Date of Patent: Aug. 11, 2009

(54) ELECTRIC HYBRID POWERTRAIN SYSTEM

(75) Inventors: Joseph Supina, Belleville, MI (US); Shailesh Kozarekar, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 347 days.

(21) Appl. No.: 11/470,361

(22) Filed: Sep. 6, 2006

(65) Prior Publication Data

US 2007/0093341 A1    Apr. 26, 2007

Related U.S. Application Data

(60) Provisional application No. 60/728,675, filed on Oct. 20, 2005.

(51) Int. Cl.
| | |
|---|---|
| *F16H 3/72* | (2006.01) |
| *F16H 37/06* | (2006.01) |
| *B60K 6/42* | (2007.10) |
| *B60K 1/00* | (2007.10) |
| *B60K 16/00* | (2007.10) |

(52) U.S. Cl. .................. 475/5; 180/65.22; 180/65.31; 180/65.6; 903/911; 903/917

(58) Field of Classification Search ............ 475/4, 475/5; 180/65.6, 65.7; 903/903, 909, 911, 903/915, 917
See application file for complete search history.

(56) References Cited

U.S. PATENT DOCUMENTS

| | | | |
|---|---|---|---|
| 5,052,988 | A | 10/1991 | Ishikawa et al. |
| 5,713,425 | A * | 2/1998 | Buschhaus et al. ......... 180/65.2 |
| 5,791,427 | A | 8/1998 | Yamaguchi |
| 6,041,877 | A * | 3/2000 | Yamada et al. ........... 180/65.25 |
| 6,478,705 | B1 | 11/2002 | Holmes et al. |
| 6,540,631 | B2 | 4/2003 | Holmes |
| 6,579,201 | B2 * | 6/2003 | Bowen ........................ 475/5 |
| 6,793,600 | B2 | 9/2004 | Hiraiwa |
| 6,994,360 | B2 | 2/2006 | Kuang et al. |
| 7,000,717 | B2 * | 2/2006 | Ai et al. ..................... 180/65.2 |
| 7,020,760 | B2 | 3/2006 | Glider |
| 2003/0205422 | A1 * | 11/2003 | Morrow et al. ............. 180/65.2 |
| 2004/0112654 | A1 | 6/2004 | Kozarekar et al. |
| 2004/0176203 | A1 * | 9/2004 | Supina et al. .................. 475/8 |

* cited by examiner

*Primary Examiner*—Tisha D Lewis
(74) *Attorney, Agent, or Firm*—David B. Kelley; Brooks Kushman P.C.

(57) ABSTRACT

A hybrid electric vehicle powertrain having an engine and an electric motor and generator sub-system, which establish mechanical and electric power flow paths. Multiple-ratio gearing in a power flow path for forward drive enhances vehicle traction torque for heavy-duty vehicle applications. Reverse drive performance is enhanced by torque multiplying gearing in a reverse drive power delivery path.

17 Claims, 13 Drawing Sheets

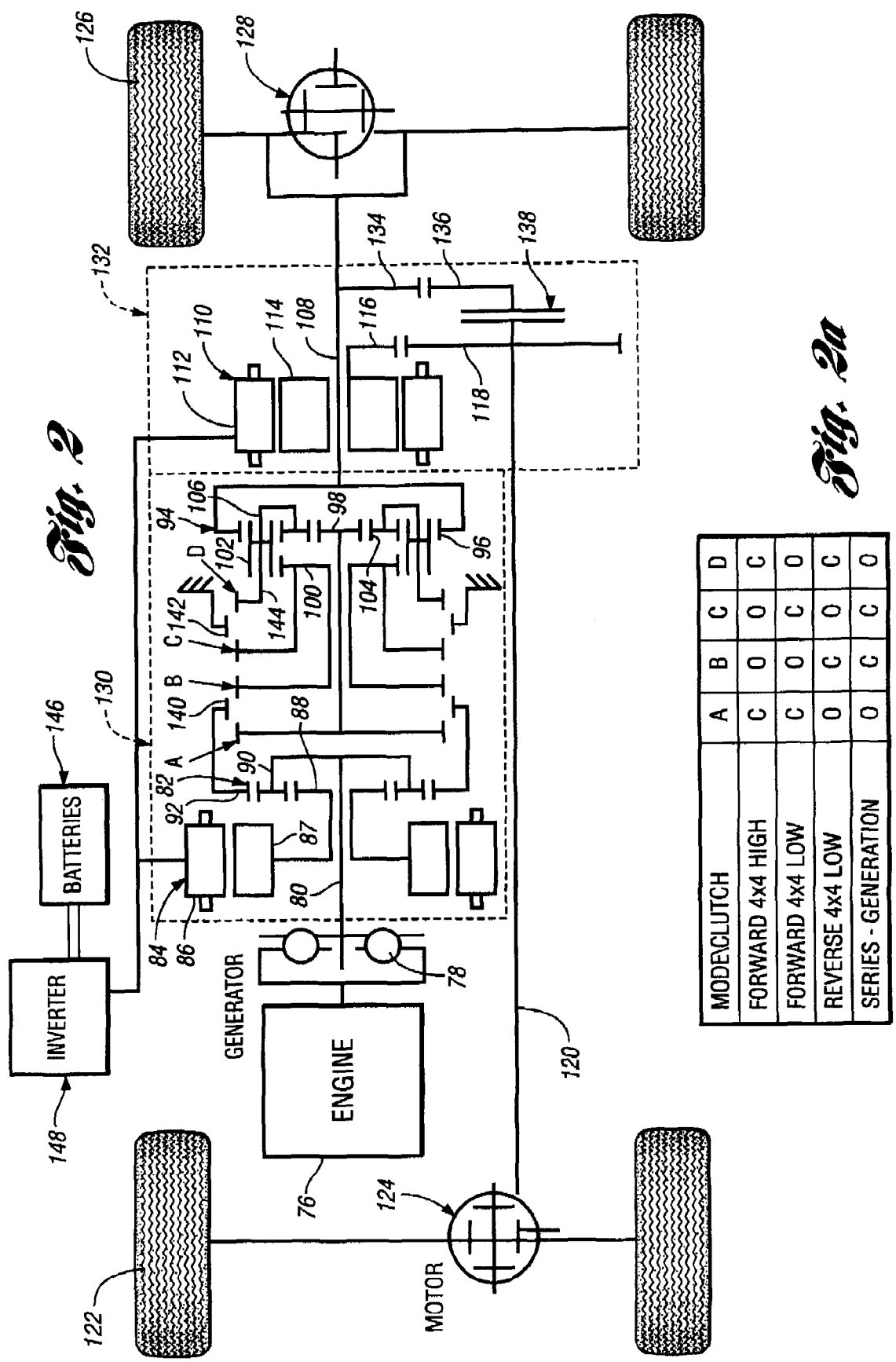

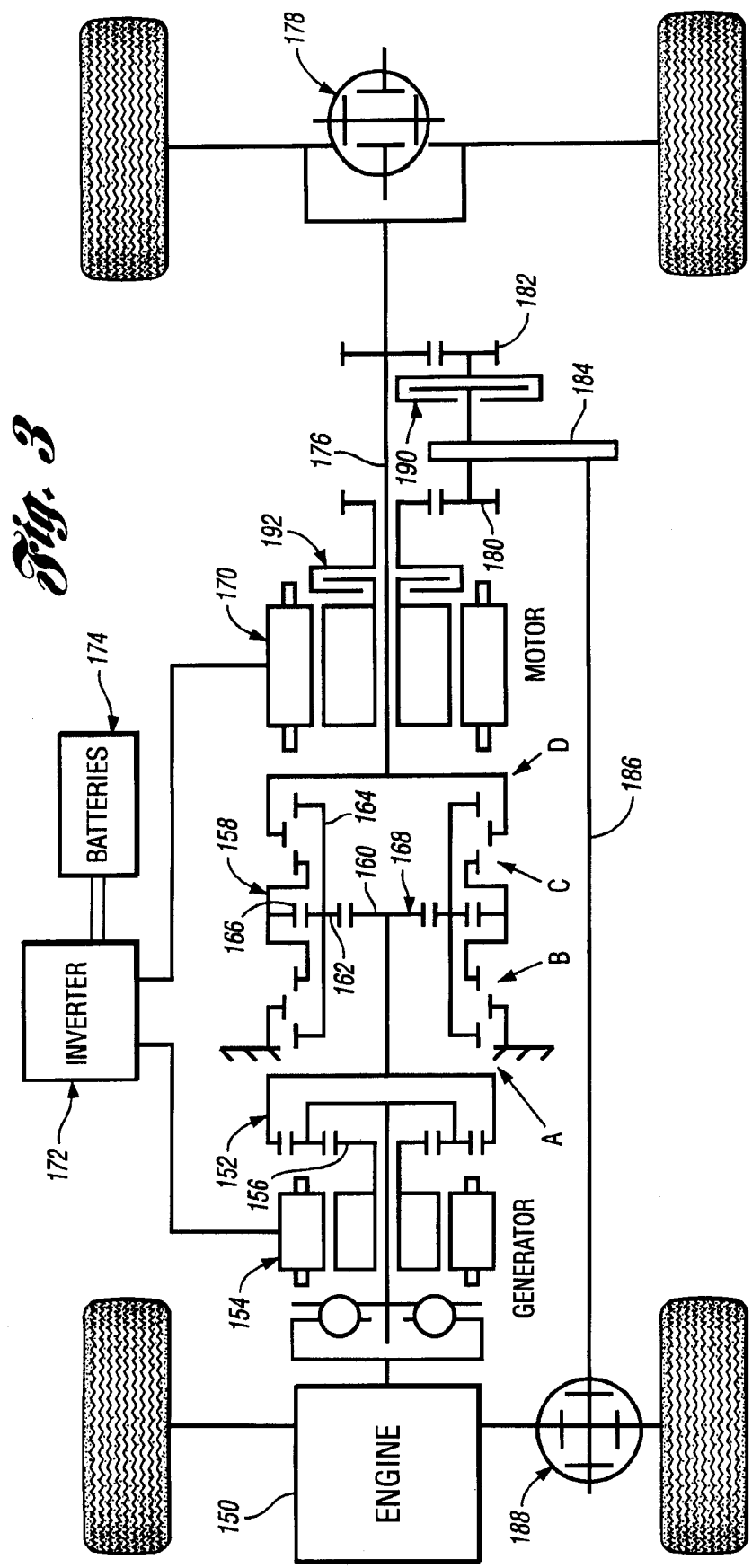

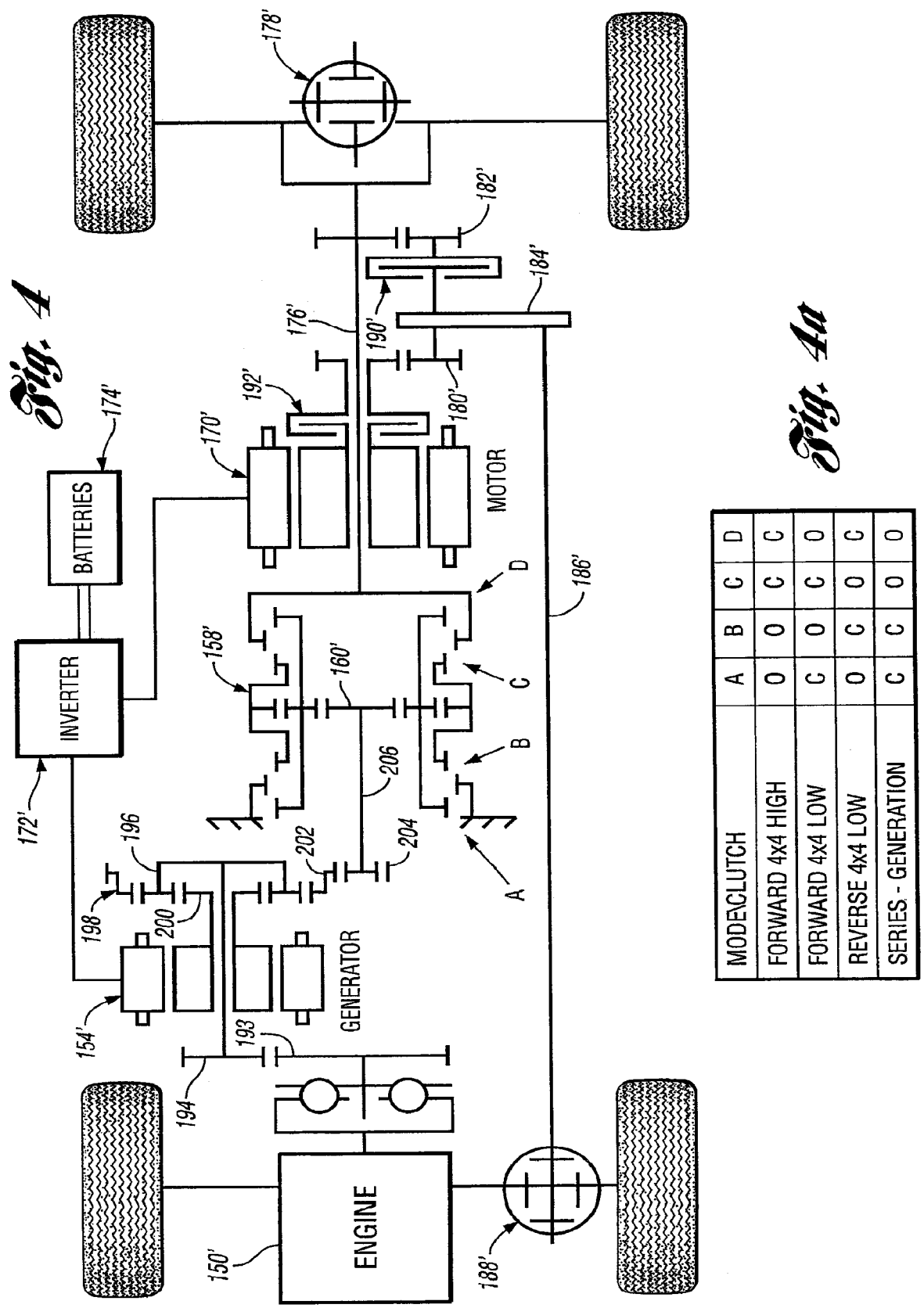

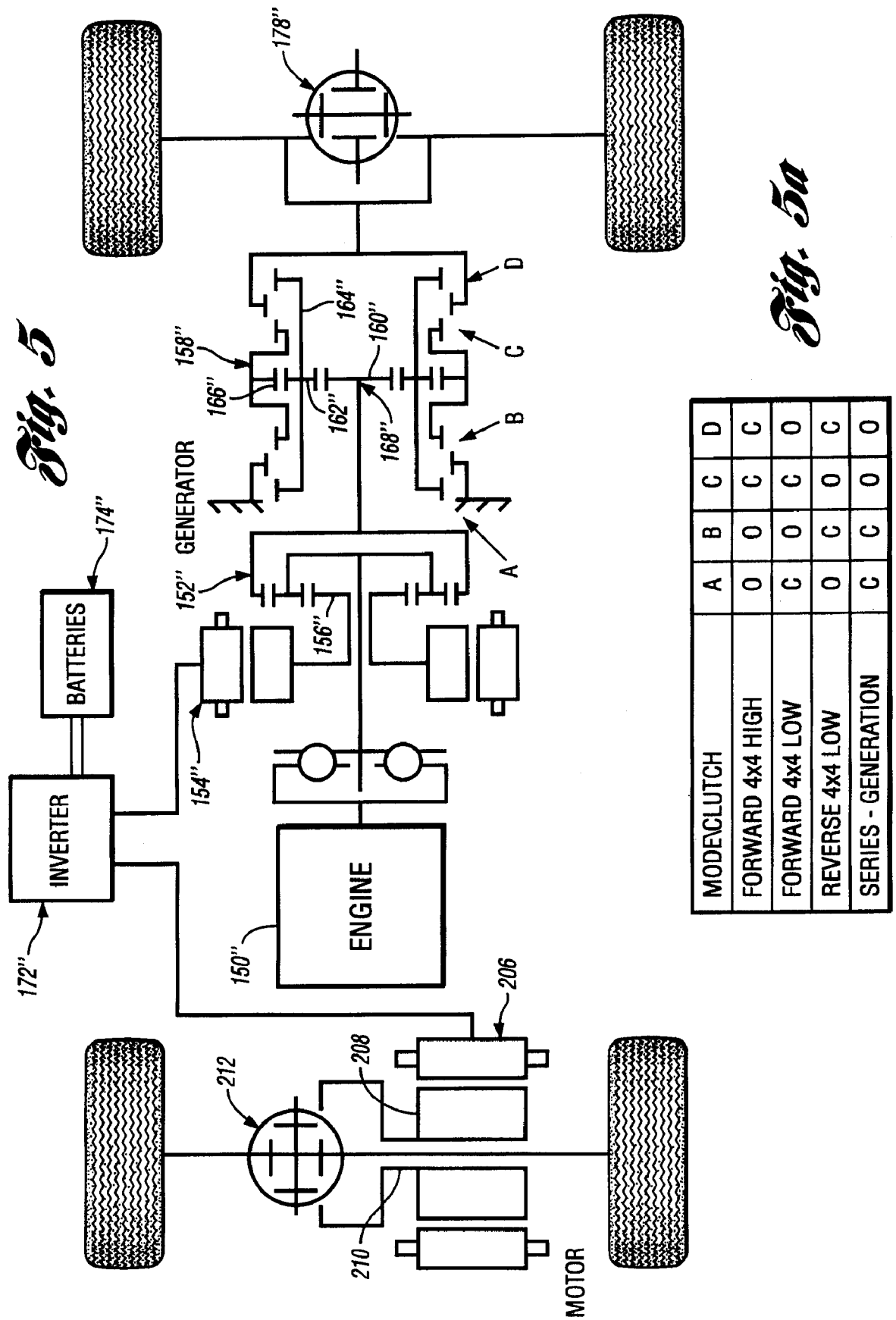

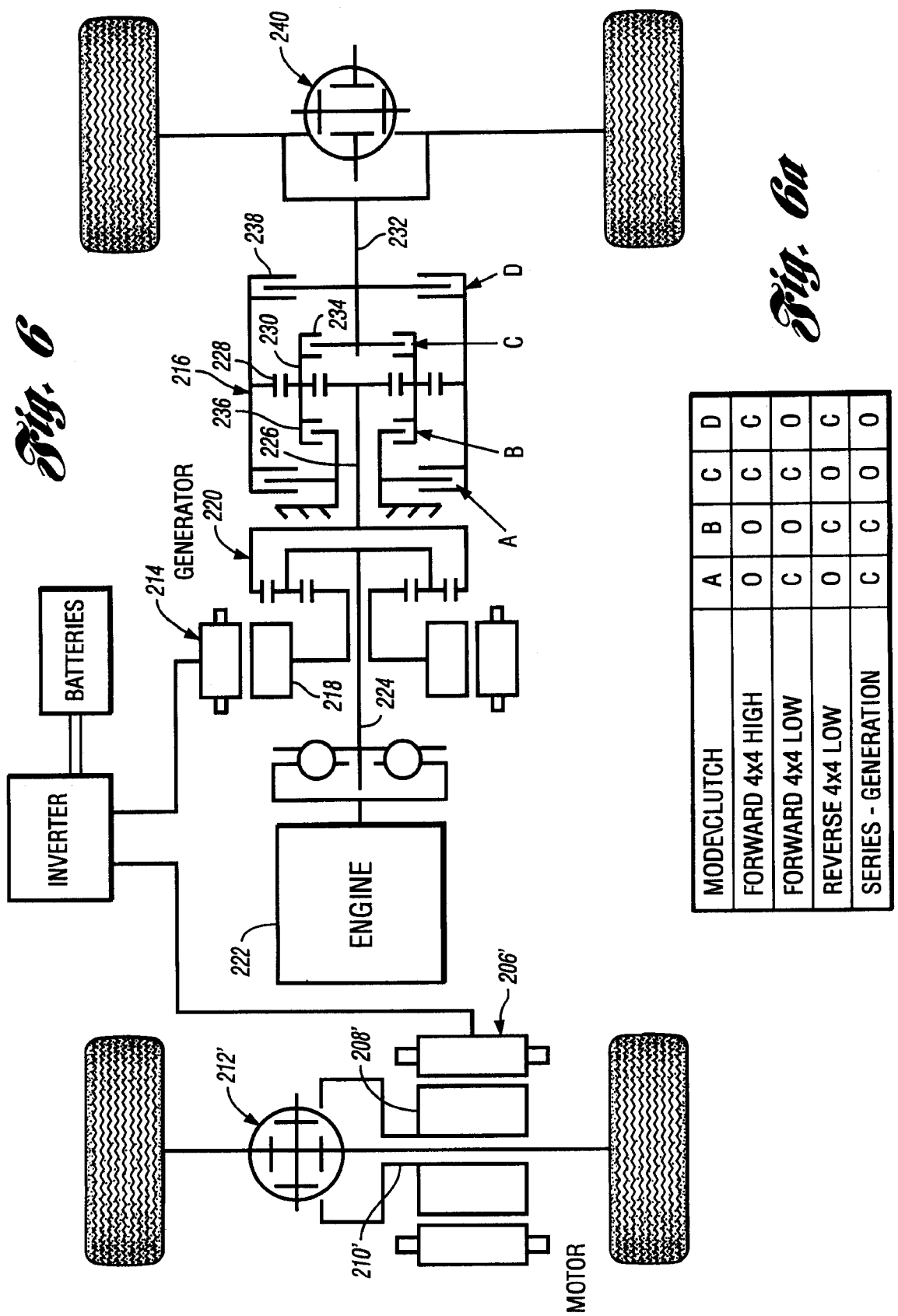

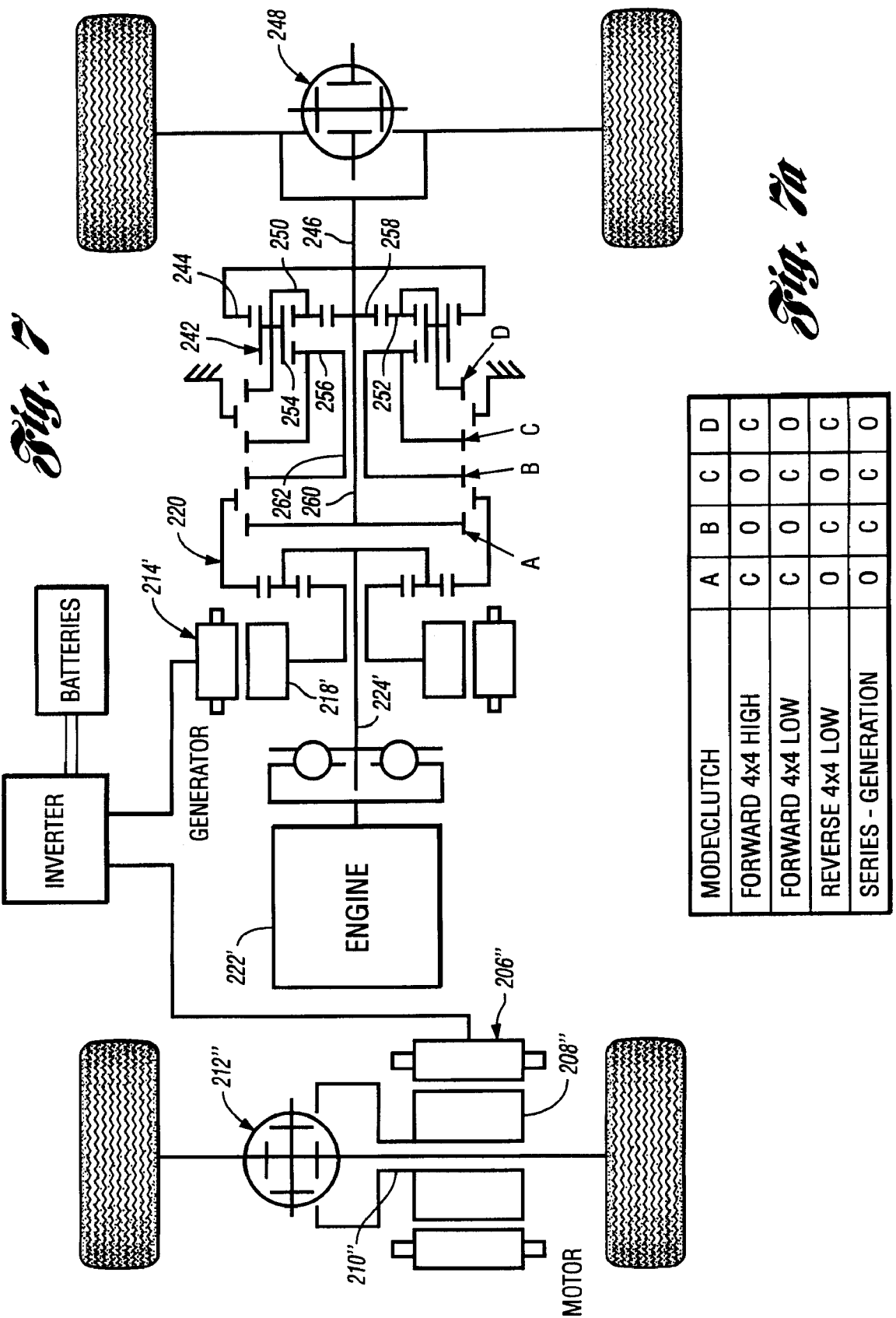

| MODE\CLUTCH | A | B | C | D |
|---|---|---|---|---|
| FORWARD 4x4 HIGH | C | O | C | O |
| FORWARD 4x4 LOW | O | C | C | O |
| REVERSE 4x4 LOW | O | C | O | C |
| SERIES - GENERATION | O | C | C | O |

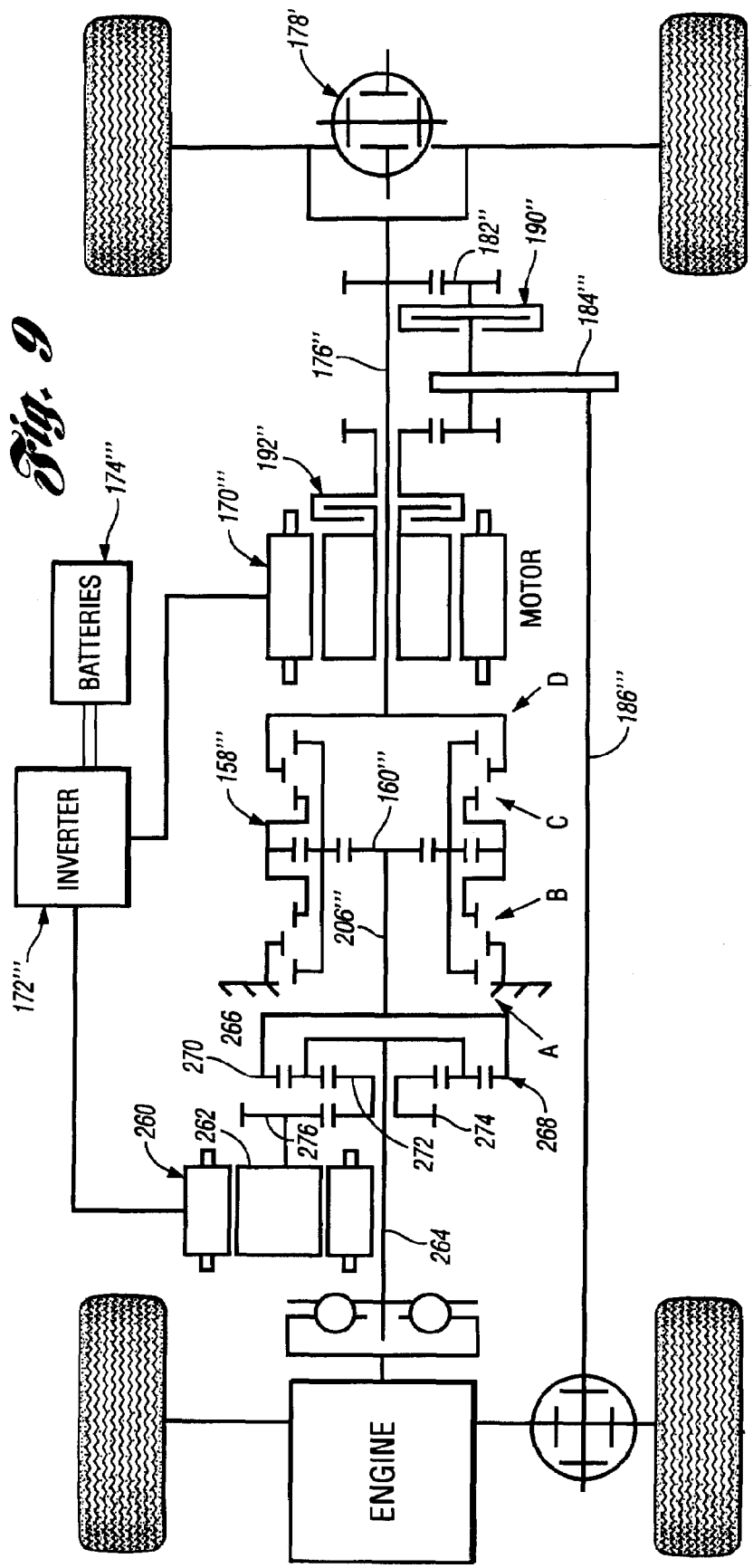

| MODE | CLUTCH | | | |
| --- | --- | --- | --- | --- |
| | A | B | C | D |
| FORWARD 4x4 HIGH | C | O | C | C |
| FORWARD 4x4 LOW | O | C | C | C |
| REVERSE 4x4 LOW | C | C | O | C |
| SERIES - GENERATION | O | C | C | O |

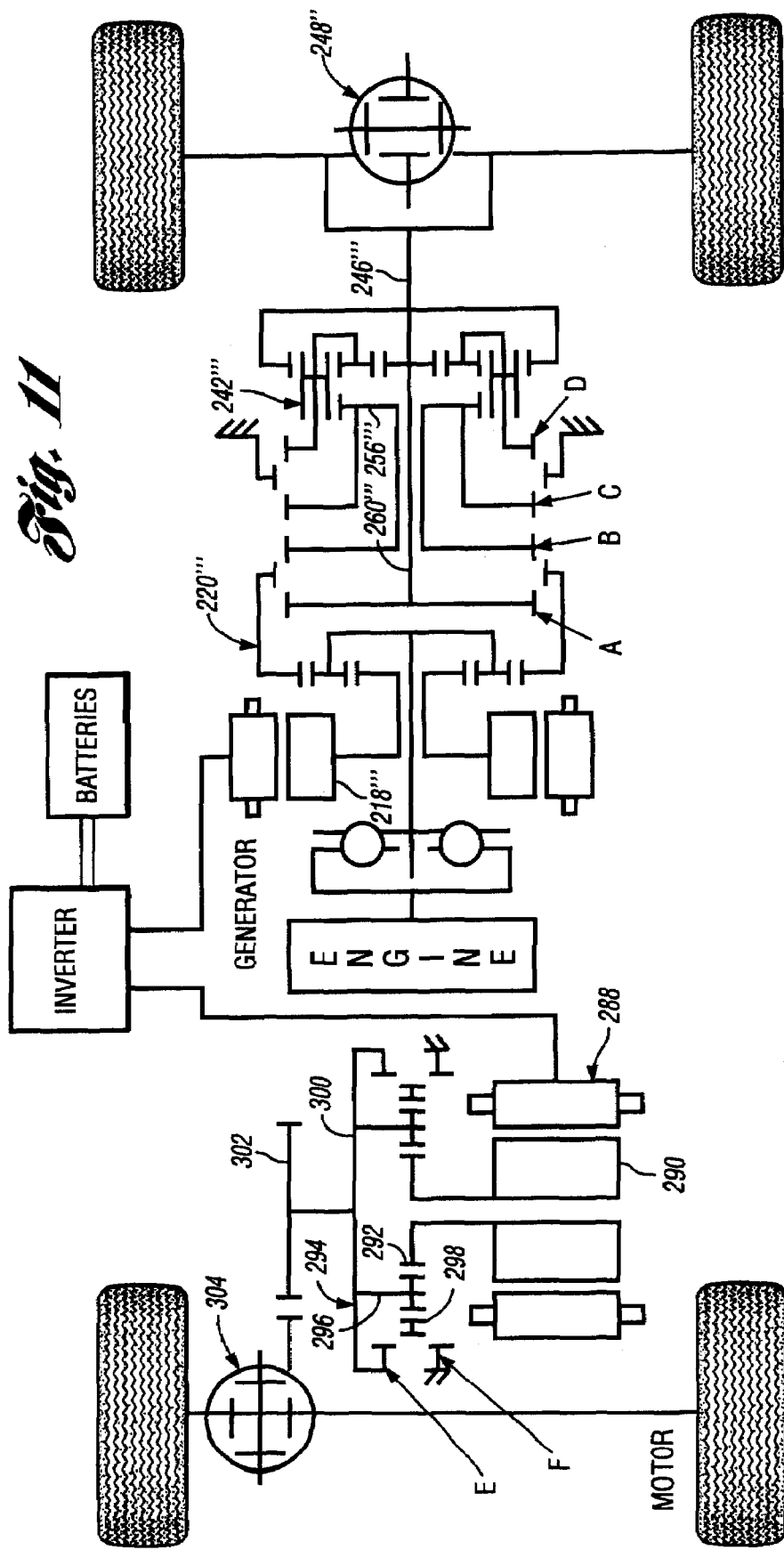

ELECTRIC HYBRID POWERTRAIN SYSTEM

CROSS-REFERENCE TO RELATED APPLICATIONS

This application claims the benefit of U.S. provisional application Ser. No. 60/728,675 filed Oct. 20, 2005.

BACKGROUND OF THE INVENTION

1. Field of the Invention

The invention relates to hybrid electric vehicle powertrains with a powersplit operating mode.

2. Background of the Invention

It is known design practice to provide hybrid electric vehicle powertrains for automotive vehicles wherein power delivery to the vehicle traction wheels takes place through a single ratio powersplit gearing system. An example of a powertrain of this type is disclosed in U.S. Pat. No. 6,994,360, which is assigned to the assignee of the present invention. Another example is disclosed in U.S. Pat. No. 5,791,427. In powertrains of this type, an electric power source comprising a motor-generator, a battery and a traction motor function with an engine power source seamlessly as they deliver torque through a gear system to the vehicle traction wheels. The battery acts as an energy storage medium for the generator and the motor. The generator can be driven by the engine in a series hybrid powertrain arrangement, and it can act as a motor in a generator drive mode.

In a powersplit operating mode, one power flow path is mechanical and the other power flow path is electrical. Power is distributed from the engine to the generator, which in turn provides electrical power to the motor. The motor drives the output shaft of the transmission through the transfer gearing.

When the powertrain is in a powersplit operating mode, engine power is divided into two paths by controlling generator speed.

During a powersplit operating mode, the powertrain can deliver only forward driving power to the traction wheels since there is no reverse gear. The generator requires either a generator speed control or a generator brake to effect engine torque delivery for forward drive. When the motor is used as a power source, it draws power from the battery and propels the vehicle independently of the engine in forward drive, as well as in reverse drive.

This characteristic of a single ratio powersplit powertrain may limit vehicle applications with which such a powertrain could be used. Reverse drive performance for some vehicles, such as large utility vehicles or heavy-duty trucks, require increased reverse drive torque. Further, a single ratio powersplit powertrain may not be capable of providing required forward drive gradeability in some vehicle applications, such as utility vehicles or trucks. It also may have limitations on its ability to provide trailer-towing performance.

The engines typically used in hybrid electric powertrains for large vehicle applications are larger than engines used in hybrid electric powertrains for small road vehicles. Further, they may require increased motor and generator sizes.

SUMMARY OF THE INVENTION

It is an objective of the invention to provide a hybrid electric vehicle powertrain that is adapted for improved forward drive gradeability and improved reverse drive performance for a heavy-duty vehicle, such as a utility vehicle or a truck. The powertrain of the invention includes a gearing arrangement that allows for selection of a 4×4 low gear drive, a reverse low gear drive and a 4×4 high gear drive. The 4×4 low gear drive improves gradeability and trailer-towing capability of a powersplit hybrid electric vehicle powertrain and also improves reverse low gear performance.

Multiple ratio gearing is used in the powertrain of the invention in combination with a motor and a motor-generator. The multiple ratio gearing is controlled by clutches and brakes that can be arranged in several configurations. The clutches may be wet clutches, positive drive dog clutches or synchronized clutches. The overall gear ratio between the output shaft of the transmission and the traction wheels can be enhanced using differential gearing alone or by adding an additional torque multiplication gearing arrangement, which can be a planetary gear arrangement, or a spur gear or a bevel gear drive.

Unlike some hybrid powertrain systems in which a generator would be disposed between an engine and a transmission, and which would include a separate motor to collect regenerative energy and to assist the engine during vehicle acceleration, the transmission of the present invention can be packaged more efficiently in a road vehicle environment. Further, the generator and the motor used in the powertrain of the invention can readily be increased in size, compared to a conventional single ratio powersplit vehicle powertrain, so that it can handle a larger engine. Notwithstanding its increased size, the powertrain of the invention can be packaged efficiently in a road vehicle environment with no space penalty or packaging constraints compared to a conventional step ratio transmission. In addition, cost savings and weight are reduced compared to a conventional step ratio transmission powertrain arrangement.

In one embodiment of the invention, a planetary gear system, which may include a compound planetary gearset with two gear ratios, is located between a motor-generator and a traction motor on an axis that is common to the engine axis. A torque transfer case, which may include the motor and torque transfer gearing, is used to transfer driving torque through a front wheel driveshaft to front traction wheels in a four-wheel, 4×4 forward drive mode and a 4×4 reverse drive mode.

In other embodiments of the invention, a two-speed planetary gear unit with selectively-engageable, positive-drive clutches and a simple planetary gearset located between the motor-generator and a traction motor can be used. The motor-generator can be located on an axis that is offset relative to the engine axis if that is required by the packaging constraints.

In other embodiments of the invention, the motor can be located on an axis coinciding with the axis of the front traction wheels and the motor-generator can be located on the engine axis.

In another embodiment of the invention, the motor may be located between the engine and the front traction wheels and a double ratio gear system delivers motor torque to the front traction wheels. The motor in this embodiment can be placed on an axis that is parallel and offset with respect to the axis of the front traction wheels.

According to another feature of the invention, the motor is capable of developing regenerative energy during coasting or engine braking. The regenerative energy is developed by the rear traction wheels as well as the front traction wheels. When the powertrain is in a 4×4 high ratio driving mode or a 4×4 low ratio driving mode, a clutch is used in the torque flow path between the front traction wheels and the rear traction wheels. This clutch will interrupt regenerative torque transfer from the rear traction wheels to the motor if there is a tendency for the rear traction wheels to slip when the front traction wheel braking exceeds the rear traction wheel braking. The magnitude of the front wheel braking may exceed the magnitude of the rear wheel braking when the vehicle speed is high.

According to another feature of the invention, the powertrain is capable of a series operating mode wherein the powersplit gearing includes a brake that provides a reaction point. The engine then drives the rotor of the generator as the output element of the powersplit gearing is disconnected from the torque output members. In this instance, the generator develops electrical energy that is distributed to the motor, which in turn drives the traction wheels. This is a pure series arrangement in which the engine powers the generator, which develops energy to power the motor, which in turn powers the traction wheels.

According to another feature of the invention, a disconnect clutch is disposed between the rotor of the motor and the power output elements of the powertrain so that the motor can be protected against an overspeed condition under certain driving conditions when the vehicle road speed is high. The disconnect clutch will disengage if a vehicle system controller detects that the motor speed exceeds a predetermined threshold value.

BRIEF DESCRIPTION OF THE DRAWINGS

FIG. 2 is a schematic drawing of a hybrid electric 4×4 powersplit powertrain with multiple ratio gearing located between a motor-generator and a traction motor;

FIG. 2a is a chart showing the clutch and brake engagement and release pattern for the multiple-ratio gearing of the embodiment of FIG. 2;

FIG. 3 is a schematic drawing of a hybrid electric powersplit powertrain with a large motor, multiple-ratio gearing and a powersplit planetary gear unit located between the motor and the motor-generator;

FIG. 3a is a chart showing a clutch and brake engagement and release pattern for the multiple-ratio powertrain shown in FIG. 3;

FIG. 4 is a schematic drawing of a hybrid electric vehicle powertrain with a motor-generator and a traction motor in which the axis for the motor-generator is offset relative to the axis of the motor and relative to the axis of the engine;

FIG. 4a is a chart showing the clutch engagement and release pattern for the clutches and brakes of the powertrain of FIG. 4;

FIG. 5 is a schematic drawing of a hybrid electric vehicle powersplit powertrain with 4×4 characteristics and a synchronized multiple-ratio transmission and with a traction motor acting on front vehicle traction wheels;

FIG. 5a is a chart showing a clutch and brake engagement and release pattern for the multiple-ratio transmission of the embodiment of FIG. 5;

FIG. 6 is a schematic drawing of the hybrid electric vehicle powersplit powertrain with 4×4 characteristics and with wet friction clutches for the multiple-ratio gearing;

FIG. 6a is a chart showing a clutch and brake engagement and release pattern for the transmission clutches and brakes of FIG. 6;

FIG. 7 is a drawing of the hybrid electric vehicle powertrain with powersplit 4×4 characteristics wherein the multiple-ratio gearing is a compound planetary;

FIG. 7a is a chart showing a clutch and brake engagement and release pattern for the clutches and brakes of the multiple-ratio gearing of the powertrain of FIG. 7;

FIG. 9 is a schematic drawing of a hybrid electric vehicle powertrain with 4×4 characteristics and with a motor-generator located on an axis that is offset relative to the engine axis and with respect to the motor axis;

FIG. 9a is a chart showing the clutch and brake engagement and release pattern for the multiple-ratio transmission in the powertrain illustrated in FIG. 9;

FIG. 11 is a schematic drawing of the hybrid electric vehicle powertrain with 4×4 powersplit characteristics wherein the traction motor is located with its axis offset and parallel to the axis of the front traction wheels and wherein the multiple-ratio transmission gearing is a compound planetary gear unit;

FIG. 11a is a chart showing the clutch and brake engagement and release pattern for the multiple-ratio transmission illustrated in FIG. 11;

PARTICULAR DESCRIPTION OF THE EMBODIMENTS OF THE INVENTION

Figure 1:
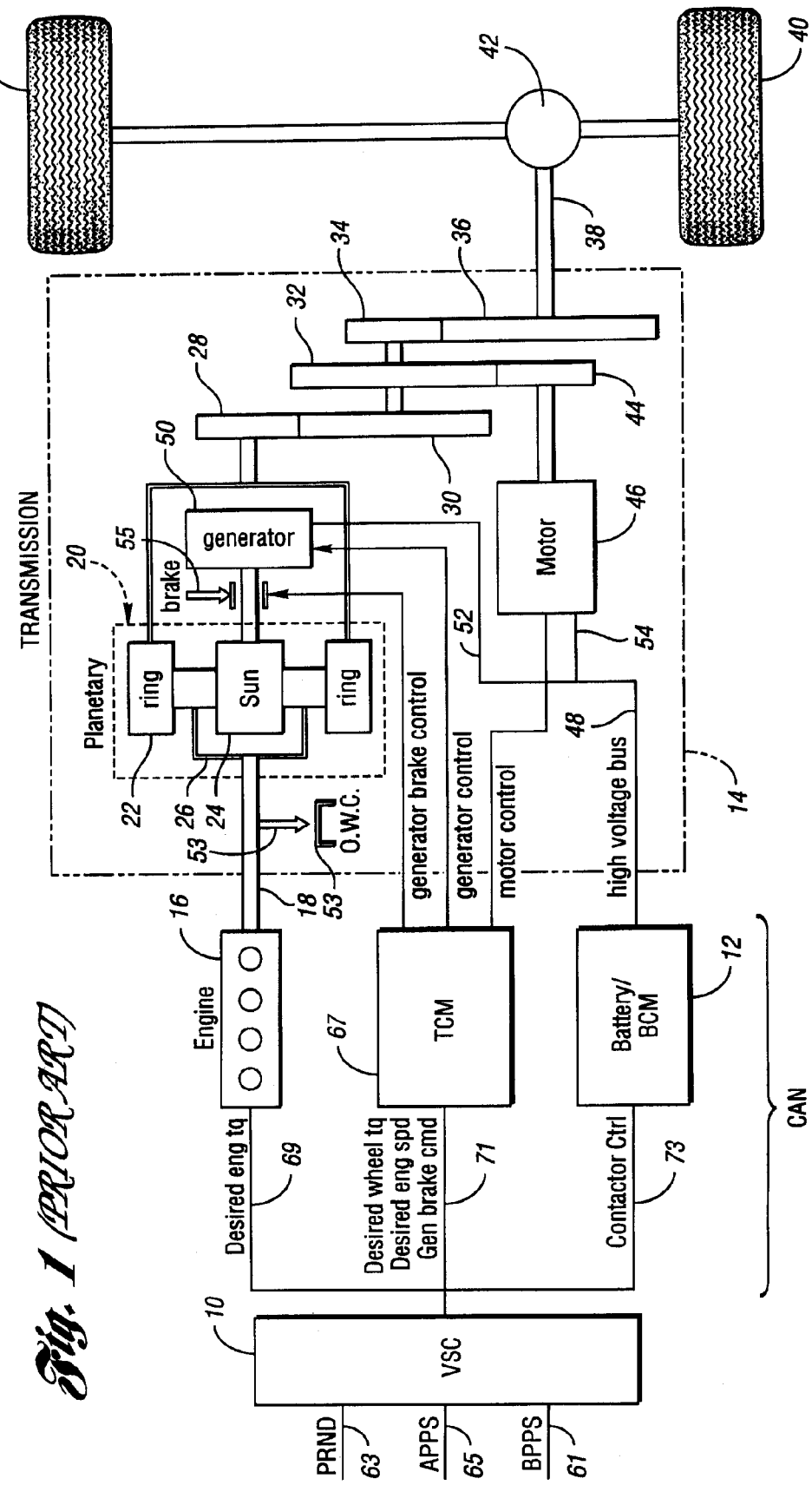
FIG. 1 is a schematic drawing of an example of a known hybrid electric powersplit hybrid electric powertrain for a two-wheel drive automotive vehicle.

A known hybrid electric vehicle powertrain is illustrated in FIG. 1. A powertrain of this type is described in the preceding discussion of the background of the invention. The powertrain of FIG. 1 includes a vehicle system controller 10, a battery and battery control module 12, and a transmission control module 67 comprising a so-called control area network (CAN). An engine 16 controlled by the controller 10 distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery 12 delivers electric power to the motor through power flow path 48. Generator 50 is connected electrically to the battery and to the motor in known fashion, as shown at 52.

When the powertrain battery 12 is acting as a sole power source with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

In FIG. 1, the vehicle system controller 10 receives a signal from a transmission range selector 63, which is distributed to transmission control module 67, together with a desired wheel torque, a desired engine speed and a generator brake command, as shown at 71. A battery contactor or switch 73 is closed after vehicle "key-on" startup. The controller 10 issues a desired engine torque request to engine 16, as shown at 69, which is dependent on accelerator pedal position sensor output 65.

A brake pedal position sensor distributes a wheel brake signal to controller, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

Figure 1A:
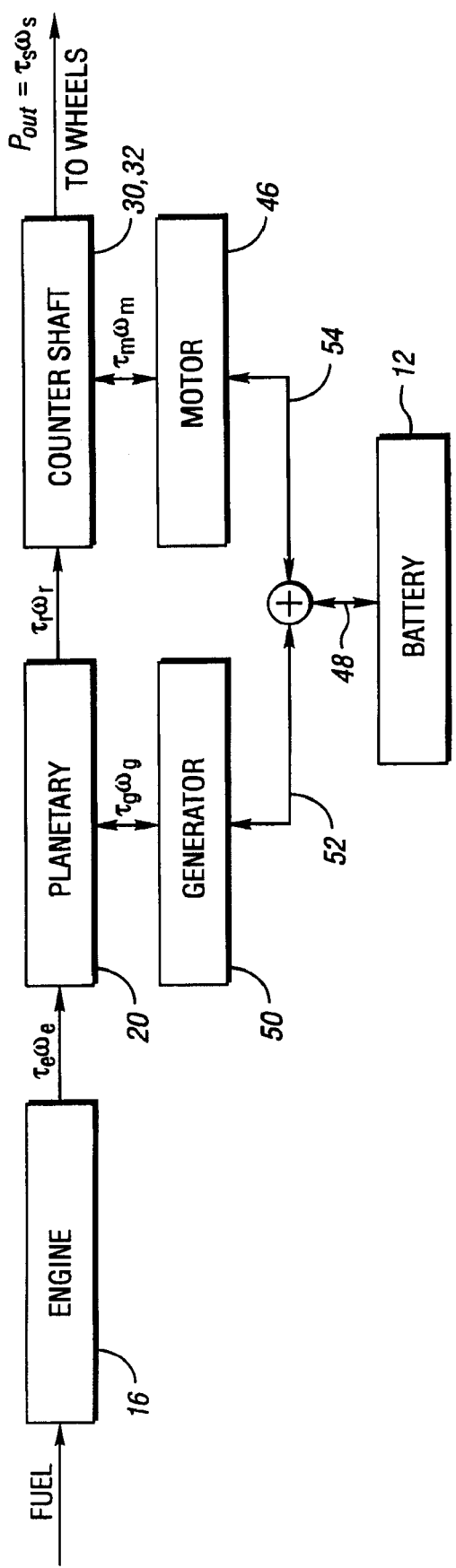
FIG. 1a is a schematic block diagram showing the power flow paths between the elements of the powertrain shown in FIG. 1.

The power flow paths between the various elements of the powertrain diagram shown in FIG. 1 are illustrated in FIG. 1a. Fuel is delivered to the engine 16 under the control of the operator in known fashion using an engine throttle. Engine power delivered to the planetary gear unit 20 is expressed as $T_e \omega_e$ where $T_e$ is engine torque and $\omega_e$ is engine speed. Power delivered from the planetary ring gear to the countershaft gears is expressed as $T_r \omega_r$, which is the product of ring gear torque and ring gear speed, respectively. Power out from the transmission 14 is represented by the symbols $T_s$ and $\omega_s$, the torque of shaft 38 and the speed of shaft 38, respectively.

The generator, when it is acting as a motor, can deliver power to the planetary gearing. Alternatively, it can be driven by the planetary gearing, as represented in FIG. 2 by the power flow path 52. Similarly, power distribution between the motor and the countershaft gears can be distributed in either direction, as shown by the power flow path 54. Driving power from the battery or charging power to the battery is represented by the bi-directional arrow 48.

As shown in FIG. 1a, engine output power can be split into two paths by controlling the generator speed. The mechanical power flow path, $T_r \omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. The engine 16 delivers power to the planetary gearing 20, which delivers power to the countershaft gears 30, 32 and 34, which in turn drive the wheels. A portion of the planetary gearing power is distributed to the generator 50, which delivers charging power to the battery 12. The speed of the generator is greater than zero or positive, and the generator torque is less than zero. The battery drives the motor 46, which distributes power to the countershaft. This arrangement is a positive split.

If the generator, due to the mechanical properties of the planetary gear unit, acts as a power input to the planetary gear unit to drive the vehicle, the operating mode can be referred to as a negative split. The generator speed being negative and the generator torque also being negative.

The generator delivers power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

If the generator brake 55 is activated, a parallel operating mode is established. Engine 16 is on and the generator is braked. The battery 12 then powers the motor 46, which powers the countershaft gearing simultaneously with delivery of power from the engine to the planetary gearing to the countershaft gearing.

The engine can deliver torque only for forward propulsion because there is no reverse gear in the countershaft gearing. The engine requires either generator control or a generator brake to permit transfer of power to the wheels for forward motion.

The second source of power is the battery, generator and motor subsystem. In this driving mode, the engine is braked by the overrunning coupling 53. The electric motor draws power from the battery and effects propulsion independently of the engine, with either forward or reverse motion. The generator may draw power from the battery and drive against a reaction of the one-way coupling 53. The generator in this mode operates as a motor.

In the embodiments of the invention, illustrated in FIGS. 2-12a, a common feature is the presence of a mechanical geared power flow path from a traction motor to the traction wheels whereby reverse driving performance is enhanced. Another feature that is common to each of the embodiments of FIGS. 2-12a is multiple-ratio gearing that provides two forward driving speed ratios, which improves powertrain gradeability for the vehicle and enhanced traction wheel driving torque that is required for heavy-duty vehicle and truck powertrains.

FIG. 2 comprises an engine 76, which is drivably coupled through a damper 78 to a torque input shaft 80 of a powersplit planetary gear unit 82. A motor-generator 84 (hereinafter called a generator) has a grounded stator 86 and a rotor 87, which is connected drivably to sun gear 88 of gear unit 82. Power input shaft 80 is connected to carrier 90 of gear unit 82. The carrier rotatably supports planetary pinions that engage sun gear 88 and ring gear 92, the latter being a torque output element of the planetary gear unit 82.

A second planetary gear unit, which is a compound planetary gear unit, is shown at 94.

Planetary gear unit 94 includes a ring gear 96, a small sun gear 98, a large sun gear 100, long planet pinions 102 and short planet pinions 104. Carrier 106 rotatably supports the pinions 102 and 104. Long planet pinions 102 are drivably engaged with sun gear 100 and ring gear 96. Short planet pinions 104 drivably engage long planet pinions 102 and sun gear 98. Ring gear 96 is a torque output element for the compound planetary gearing and is connected drivably to power output shaft 108.

An electric traction motor 110 has a fixed stator 112 and a rotor 114 drivably connected to a first power output torque transfer gear 116, which drives the second torque transfer gear 118, which is connected to front traction wheel driveshaft 120. Front traction wheels 122 are drivably connected to driveshaft 120 through a conventional geared differential mechanism, shown schematically at 124. Power output shaft 108 is drivably connected to rear traction wheels 126 through a conventional rear differential-and-axle assembly 128.

The generator 84, the two planetary gear units and the clutch and brake structure, which will be described subsequently, are identified in FIG. 2 as a transmission 130. The motor 110 and the torque transfer gearing 118 and 116 are included in a transfer case portion of the powertrain, as indicated at 132. Motor 110 acts as a generator during regenerative braking.

Power output shaft 108 is drivably connected to a torque output gear 134, which meshes with torque transfer gear 136. A selectively engageable clutch 138 will deliver regenerative torque, when it is engaged, to the motor from the rear traction wheels through driveshaft 108 and gears 134 and 136. It will be commanded to disengage if front wheel regenerative energy exceeds rear wheel regenerative energy by a predetermined amount. This will avoid rear wheel skidding during high speed coasting.

When the vehicle is in a coasting mode at low vehicle speed, regenerative torque is delivered from the rear traction wheels through gears 134 and 136 and through engaged clutch 138 to gear 118, which drives gear 116 and the rotor of the motor 110. Simultaneously, regenerative energy is delivered from the front traction wheels through driveshaft 120 and gears 118 and 116 through the rotor. If the vehicle speed is high during engine braking or during a regenerative braking mode, it is possible for regenerative energy at the front wheels to exceed regenerative energy at the rear wheels. This imbalance of the regenerative energy may cause slippage of the rear wheels. To avoid this condition, the clutch 138 will be disengaged. The controller, which corresponds to the controller 10 (VSC) of FIG. 1, will detect an incipient rear wheel slip condition, thereby causing the clutch 138 to disengage.

A shiftable clutch element 140 can be shifted in the left-hand direction to engage a clutch element identified as clutch A in FIG. 2a. It can be shifted in the right-hand direction to engage a clutch element identified as clutch B in FIG. 2a.

A brake element 142 can be shifted in a left-hand direction to engage a brake element identified as brake C in FIG. 2a. It can be shifted in a right-hand direction to engage a brake element identified as brake D in FIG. 2a. Brake element D is connected to compound planetary gear carrier 144 for compound planetary gear unit 94.

The motor is drivably connected to the front traction wheels by torque multiplying gearing. Such gearing may be used to multiply the rotor torque of the traction motor, as the traction motor drives the front traction wheels.

FIG. 2a is a chart that shows the clutch and brake engagement and release pattern for the gearing of FIG. 2. When clutch A and brake D are engaged, the powertrain is conditioned for a forward 4×4 high ratio drive mode. Mechanical power then is distributed from the ring gear 92 to the sun gear 98 of the compound planetary gear unit 94. Power output shaft 108 then is driven at a high ratio.

To establish a forward 4×4 low driving mode, clutch A is applied, brake D is released and clutch C is applied. Mechanical power from the ring gear 96 then drives shaft 108 with a low ratio.

Reverse drive is obtained by releasing clutch A and brake C and by applying clutch B and brake D. Ring gear torque then drives large sun gear 100. With the compound carrier 106 acting as a reaction member, ring gear 96 and shaft 108 are driven in a reverse direction.

A series hybrid drive arrangement is attained by releasing clutch A and brake D and by applying clutch B and brake C. This anchors large sun gear 100 and ring gear 92. Thus, engine power delivered to the carrier 90 will drive the rotor 88 thereby developing electrical energy that powers the motor 110.

In the embodiment of FIG. 2, the battery is indicated at 146. An AC/DC inverter 148 is disposed in the electrical circuit between the inverter 146 and the generator 84 whereby battery 146 may act as a source of electrical power or as an electrical energy storage medium depending upon the state-of-charge of the battery and upon the vehicle operating mode.

In the embodiment of FIG. 3, engine 150 powers the carrier of a simple planetary powersplit gear unit 152. A generator 154 has a rotor connected to the sun gear 156 of the powersplit gear unit 152. The gearing arrangement of the embodiment of FIG. 3, like the embodiment of FIG. 1, has two forward ratios and a single reverse ratio. The transmission is indicated at 158. It has positive drive clutches and a brake, which are identified by the letters A, B, C, and D. These elements may be unsynchronized dog clutches or they may be synchronized depending upon a design choice.

During forward drive, the ring gear of planetary gear unit 152 drives sun gear 160 of the transmission 158. Sun gear 160 meshes with planet pinions 162 on carrier 164. A ring gear 166 engages planet pinions 162. Sun gear 160, planet pinions 162, carrier 164 and ring gear 166 comprise a simple planetary gear unit identified by reference character 168.

A traction motor 170 is electrically coupled to AC/DC converter 172 and battery 174, together with the generator 154.

The power output shaft 176 extends through the rotor of the motor 170 and delivers torque from the planetary gear unit 168 to the traction wheels through differential-and-axle assembly 178. Motor torque is delivered to the differential-and-axle assembly 178 through torque transfer gearing, which includes countershaft gears 180 and 182. A transfer drive chain or belt and pulley arrangement 184 transfers driving torque to front wheel driveshaft 186 to front traction wheel differential-and-axle assembly 188. As previously explained with reference to FIG. 2, the embodiment of FIG. 3 has a disconnect clutch 190, which will be commanded to open if rear traction wheel slippage is detected during engine braking or coasting at high speeds.

In addition to clutch 190, the embodiment of FIG. 3 includes a disconnect clutch 192 between the rotor of the motor 170 and the countershaft gears 180 and 182. The clutch 192 will protect the motor from over-spinning under certain operating conditions, especially when the vehicle is in a forward low ratio drive mode. An overspeed condition can be detected using a speed sensor, the output of which can be monitored by the vehicle system controller, which issues a command for disengagement of the clutch if the rotor speed exceeds a special value.

The embodiment of FIG. 4 has elements that are common to the elements of FIG. 3. For this reason, the common elements are identified by similar reference characters, although prime notations are added.

In FIG. 4, the generator 154' is mounted on an axis that is offset from the engine axis. A generator drive gear 193 drivably engages a countershaft gear 194, which is connected to carrier 196 of planetary gear unit 198. Sun gear 200 of gear unit 198 is connected to the rotor of generator 154'. Ring gear 202 for gear unit 198 is connected to the sun gear 160' through a drive pinion 204 and sun gear shaft 206.

The arrangement of FIG. 4 may provide improved packaging capability in a vehicle powertrain environment as well as flexibility in a choice of a gearing ratio between the generator and the transmission gearing. A4

Clutches and brakes A, B, C, and D in the embodiment of FIG. 4 are the same as the corresponding functions of the clutches and brakes A, B, C, and D in the embodiment of FIG.

3. The clutch and brake application and release pattern of FIG. 4a is identical to the clutch and brake application and release pattern of FIG. 3a.

The embodiment of FIG. 5 has elements that are common to the embodiment of FIG. 3, including a geared transmission capable of providing two forward driving ratios and a reverse ratio. The common elements of the embodiment of FIG. 5 are identified by similar reference numerals, although double prime notations are added. The functions of the clutches and brakes A, B, C and D are the same as the functions of clutches and brakes A, B, C and D of FIG. 3a. The table identified as FIG. 5a, therefore, is identical to the table identified as FIG. 3a. The embodiment of FIG. 5 differs, however, from the embodiment of FIG. 3 because the motor is located on the axis of the fronttraction wheels rather than on the engine axis, as in the case of FIG. 3. The battery 174", the AC/DC inverter 172" the generator 154" and the motor 206 are electrically coupled. The rotor for the motor 206, as shown at 208, is drivably connected to torque output shaft 210, which is drivably connected by differential and axle assembly 212 to the front traction wheels. This eliminates the need for the torque transfer gearing, shown in FIG. 3, as well as the need for a front wheel driveshaft 186.

FIG. 6 shows an embodiment of a transmission that has characteristics similar to the characteristics of the embodiment of FIG. 5. In the case of the embodiment of FIG. 6, however, the clutches are friction clutches, which may be characterized as wet clutches that allow for a slippage of the clutch friction elements during clutch engagement.

The generator in the embodiment of FIG. 6 is identified by reference numeral 214, and the multiple-ratio transmission gearing is identified by reference numeral 216. The rotor 218 is connected to the sun gear of powersplit simple planetary gear unit 220. The carrier of gear unit 220 is drivably connected to engine 222 by power input shaft 224. As in the case of the previous embodiments, the ring gear of the powersplit planetary gear unit 220 is connected drivably to power input shaft 226 of the transmission gearing 216.

The transmission gearing comprises a simple planetary gear unit 228. The carrier 230 of gear unit 228 is connected to power output shaft 232 by friction wet clutch 234. The carrier 230 may be braked by wet clutch 236 to hold the carrier 230 stationary during reverse drive. Wet clutch 236 may be referred to as well as a brake.

The ring gear of simple planetary gear unit 228 can be connected directly to power output shaft 232 by friction wet clutch 238. Power output shaft 232 is drivably connected to the rear traction wheels by a differential and axle assembly 240.

The gearing of the embodiment of FIG. 6 is capable of providing two forward ratios and a reverse ratio, as well as a pure series operating mode by selectively engaging and releasing the clutches and brakes in accordance with the clutch and brake engagement and release pattern of FIG. 6a, which is the same pattern indicated in FIG. 5a.

Unlike the gearing of the embodiment of FIG. 6, the embodiment of FIG. 7 has a compound planetary gear unit, rather than a simple planetary gear unit. The compound planetary gear unit, which is indicated at 242, may be referred to as a so-called Ravigneaux gearset. It includes a ring gear 244 connected drivably to power output shaft 246, which is in turn connected to rear traction wheels by a differential and axle assembly 248. A compound carrier 250 journals a set of small planetary pinions 252 and a set of long planetary pinions 254. The pinions 252 and 254 engage each other. Pinions 254 drivably engage ring gear 244 and large sun gear 256. Short planetary pinions 252 drivably engage small sun gear 258.

Sun gear 258 is connected drivably to central shaft 260, and sun gear 256 is connected drivably to central sleeve shaft 262.

The ring gear of planetary powersplit gear unit 220 can be selectively connected by clutch A to central shaft 260. It can be connected alternatively to shaft 262 by clutch B.

Brake C selectively brakes large sun gear 256, and brake D selectively brakes carrier 250.

To establish forward 4×4 high ratio drive, clutch A is applied and brake D is applied while clutch B is released and brake C is released.

With sun gear 258 acting as a torque input element for the gear unit 242 and with the carrier 250 acting as a reaction element, the compound planetary gear unit 242 will establish a high ratio forward drive. A low ratio forward drive is obtained by releasing brake D and applying brake C so that the large sun gear 256 acts as a reaction element rather than the carrier 250.

With the sun gear 256 acting as a power input element and the carrier acting as a reaction element, ring gear 244 is driven in a reverse direction.

A pure series arrangement is obtained by braking sun gear 256 with brake C. Since clutch B is applied at this time, the ring gear of powersplit planetary gear unit 220 is anchored. The engine then drives the rotor 218' of the generator 214'. The electrical energy generated by the generator 214' drives motor 206".

Elements in the embodiment of FIG. 7 that are common to the embodiment of FIG. 6 have been indicated by similar reference numerals, although single prime or double prime notations are added.

Figures 8, 8A:
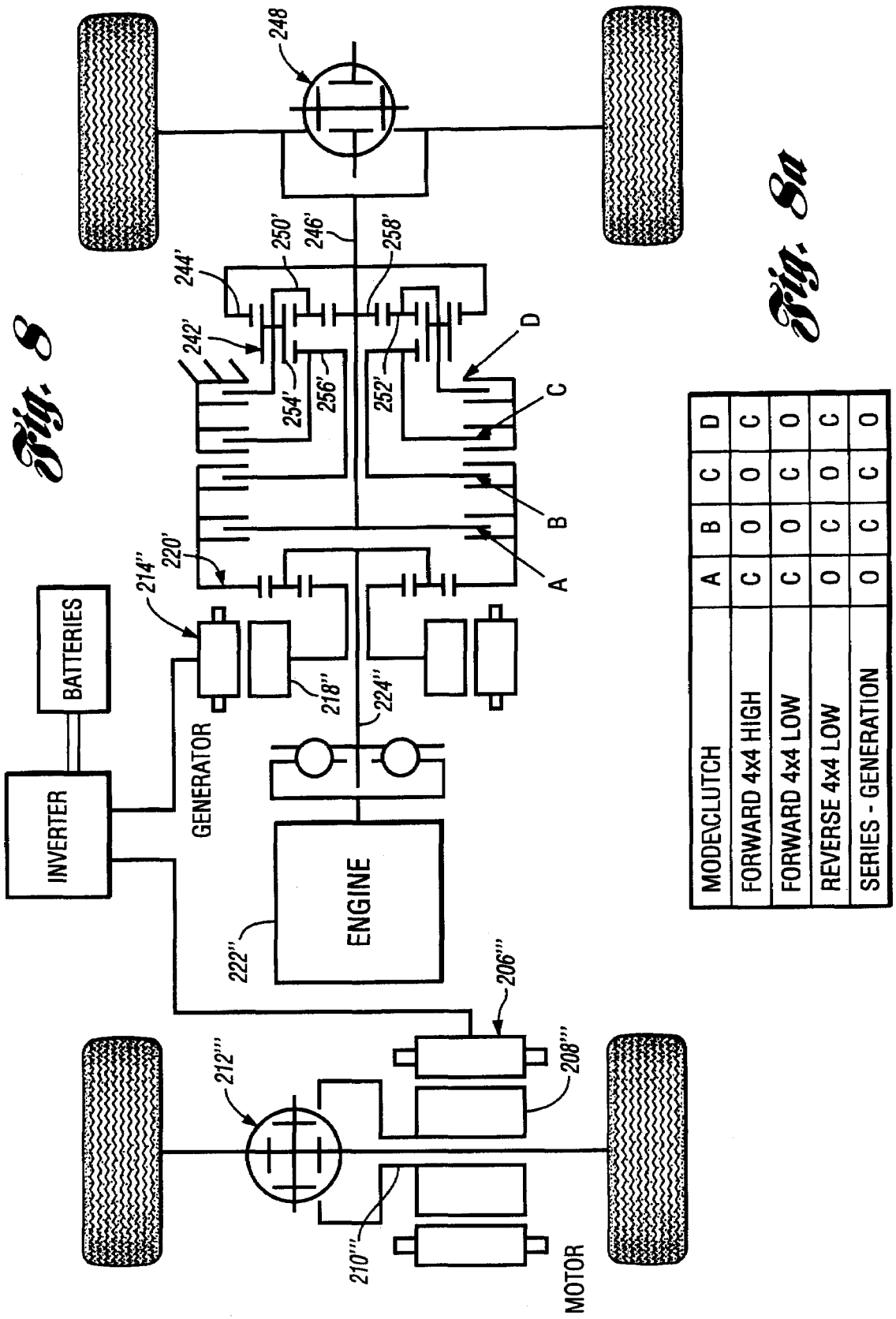
FIG. 8 is a schematic representation of a powersplit hybrid electric vehicle powertrain with 4×4 characteristics wherein the planetary gearing is controlled by wet clutches, the planetary gearing including a compound planetary gear unit.
FIG. 8a is a chart showing the clutch and brake engagement release pattern for the multiple-ratio transmission of the powertrain illustrated in FIG. 8.

The transmission gearing of the embodiment of FIG. 8 is located relative to the generator and the engine at a location corresponding to the location of the transmission gearing of the embodiment of FIG. 7. The clutches and brakes for controlling the compound planetary gear unit 242, however, are friction elements, unlike the clutches and brakes of the embodiment of FIG. 7 where the clutches and brakes are positive engagement couplings. The clutch and brake engagement and release pattern for the clutches and brakes of the embodiment of FIG. 8 is identical to the clutch engagement and release pattern indicated in FIG. 7a for the embodiment of FIG. 7, as well as the clutch and brake engagement and release pattern shown in FIG. 4a for the embodiment of FIG. 4. The clutches shown in FIG. 8 may be wet clutches with lubricated friction elements.

In the embodiment of FIG. 9, the generator is shown at 260. It has a rotor shaft that is offset and parallel to engine driven power input shaft 264. The carrier 266 of planetary powersplit gear unit 268 is driven by the shaft 264. The ring gear 270 of gear unit 268 drives torque input shaft 206''' for the transmission gearing 158'''. Sun gear 272 or gear unit 268 has a companion gear 274 which drives generator rotor 262 through generator drive gear 276.

The clutch and brake engagement and release pattern of the embodiment of FIG. 9, which is indicated in FIG. 9a, is identical to the clutch and brake release pattern for the embodiment of FIGS. 4 and 5. The location of the generator relative to the engine and the motor in the case of FIG. 9 will adapt the powertrain so it can be packaged in a fashion similar to the packaging arrangements available for the embodiment of FIG. 4.

Figures 10, 10A:
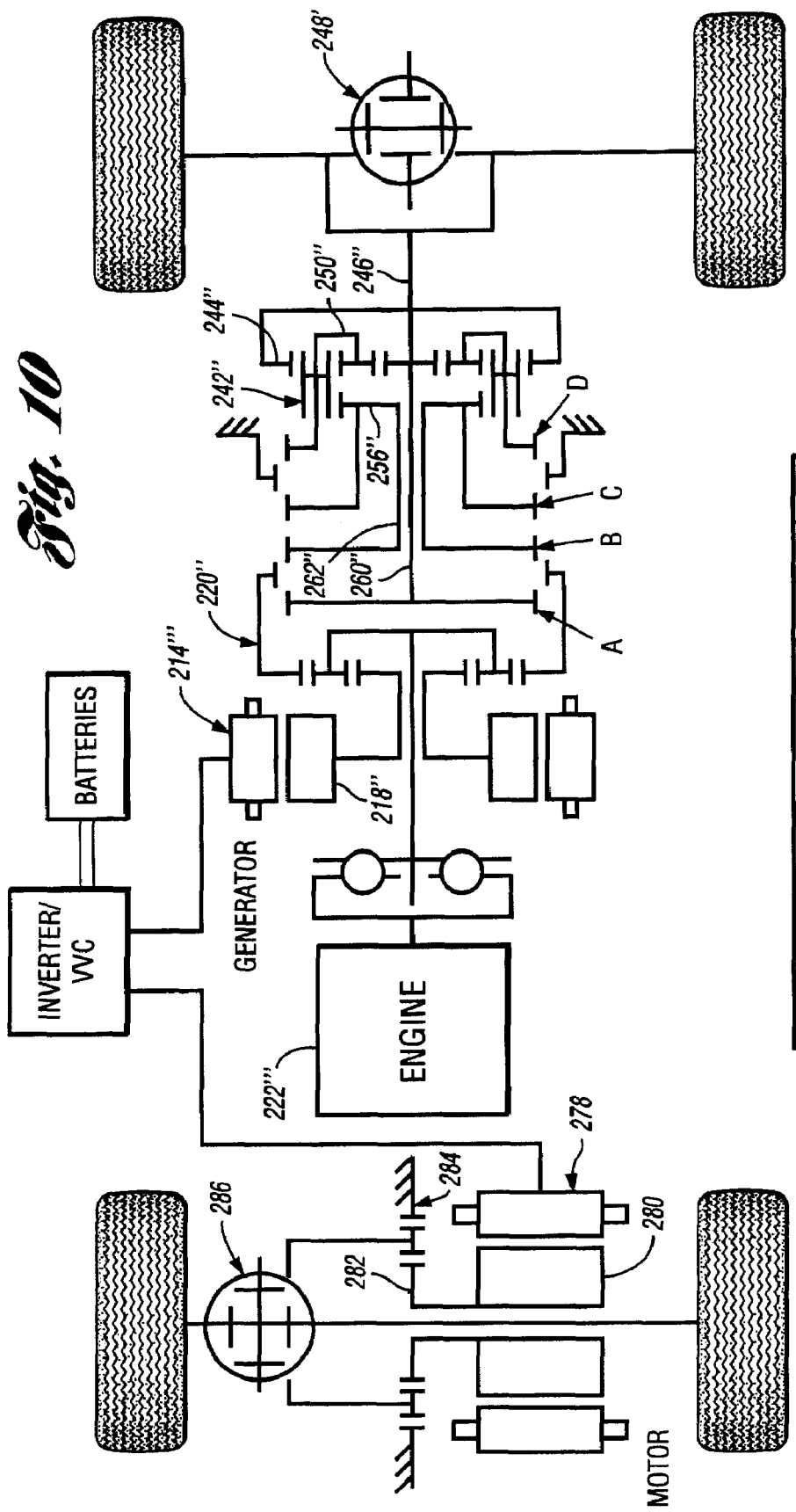
FIG. 10 is a schematic drawing of a hybrid electric vehicle powertrain with 4×4 powersplit characteristics wherein the motor is located at the front traction wheel axis and wherein the multiple-ratio gearing is a compound planetary gear unit.
FIG. 10a is a chart showing a clutch and brake engagement and release pattern for the powertrain illustrated in FIG. 10.

The embodiment of FIG. 10 has elements common to the embodiment of FIG. 7. Common elements are identified by similar reference numerals, although double prime or triple prime notations are added.

In the case of the embodiment of FIG. 10, the motor, shown at 278, is drivably connected to front traction wheels with the rotor of the motor being mounted on an axis transversely disposed with respect to the engine axis. Rotor 280 of the motor 278 is connected drivably to sun gear 282 of a planetary reduction gear unit 284. The carrier of the reduction gear unit 284 is connected to the input gear element of a differential-and-axle assembly 286. The differential side gears for differential-and-axle assembly 286 are connected to the traction wheels. Motor torque distributed to the front traction wheels is multiplied by the planetary gear unit 284.

The embodiment of FIG. 11 has a generator and a transmission gearing arrangement that are the same as the generator and planetary gear arrangement of FIG. 10. Common elements are identified by similar reference numerals, although double prime and triple prime notations are added. Unlike the embodiment of FIG. 10, the embodiment of FIG. 11 has a motor that is mounted between the front wheel axis and the engine and is offset from the front wheel axis, as shown at 288. The rotor of the motor 288, as shown at 290, is drivably connected to sun gear 292 of a planetary gear unit 294, which provides two driving speed ratios between the motor 288 and the front traction wheels. The planetary gear unit 294 has a carrier 296 that can be clutched to ring gear 298 by clutch E. The torque output element of the gear unit 294 is carrier 300, which is connected drivably to torque transfer gear 302 which drives the input gear for the differential-and-axle assembly 304. The side gears of the differential-and-axle assembly 304 drive the front traction wheels.

If clutch E is engaged, the gear reduction ratio between the motor and the differential-and-axle assembly is 1:1. A brake F is used to anchor ring gear 298 to provide a gear multiplication between the traction motor 288 and the differential-and-axle assembly.

The clutch and brake engagement and release pattern for the embodiment of FIG. 11 is the same as the clutch and brake engagement and release pattern shown in FIG. 10a for the embodiment of FIG. 10. The clutch and brake engagement and release pattern for clutch E and brake F, however, has been added for high and low motor drive, respectively.

Figures 12, 12A:
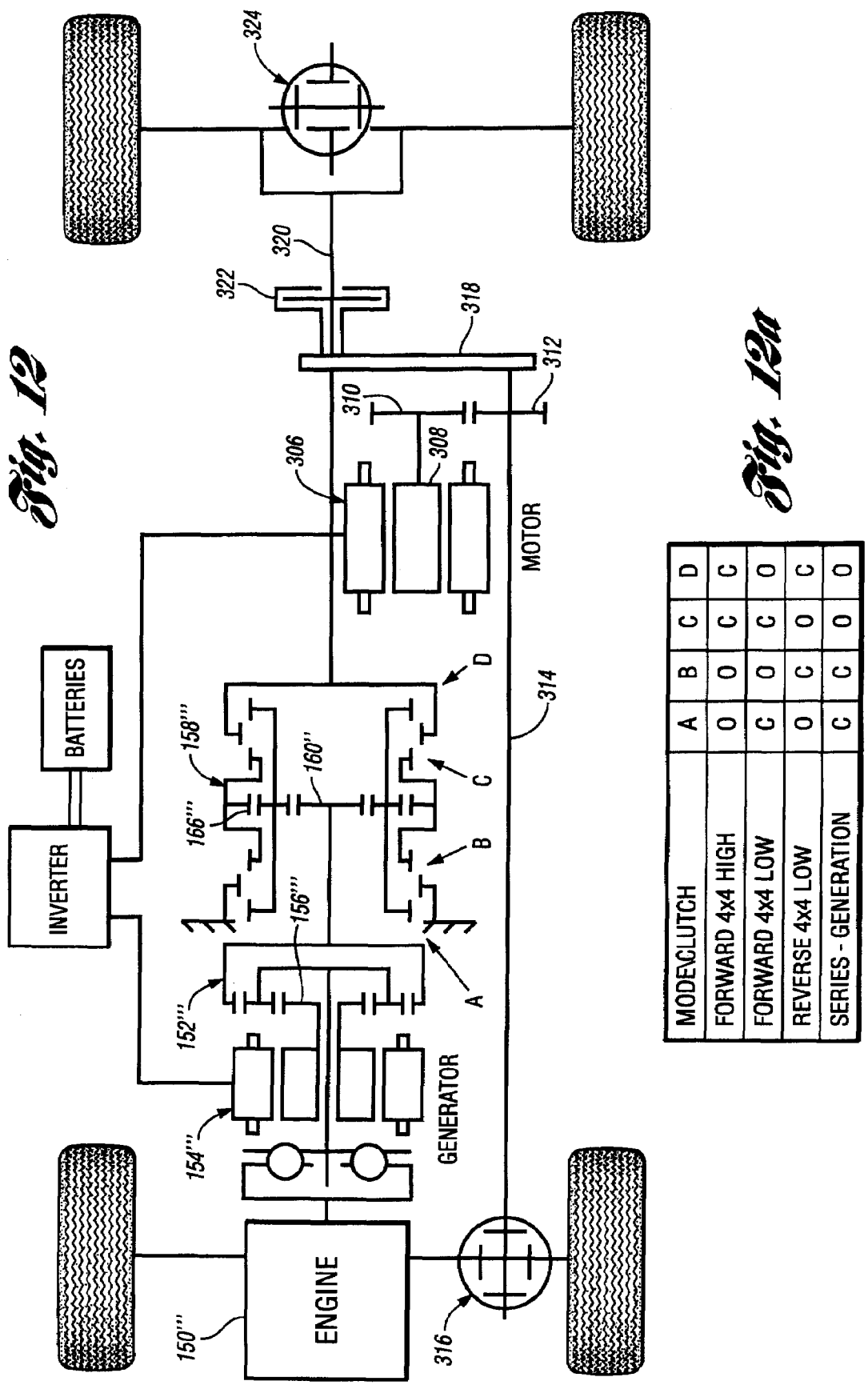
FIG. 12 is a schematic drawing of a hybrid electric vehicle powertrain with 4×4 powersplit characteristics including a multiple-ratio transmission between a motor-generator and a traction motor and wherein the traction motor is located on a motor axis that is offset and parallel to the axis of the engine and the motor-generator.
FIG. 12a is a chart showing a clutch and brake engagement and a release pattern for the powertrain illustrated in FIG. 12.

The embodiment of FIG. 12 has features that are common to the embodiment of FIG. 5. The common elements have been identified by similar reference numerals, although double prime notations or triple prime notations are added. In the design of FIG. 12, the motor, shown at 306, is located on a countershaft axis. The rotor 308 of the motor 206 is drivably connected to torque transfer gear 310, which engages torque transfer output gear 312. This drives front wheel driveshaft 314 which distributes driving torque to the front differential-and-axle assembly 316. Gear 312 also drives a drive pulley for a chain or belt transfer drive 318. The other drive pulley for transfer drive 318 is connected to torque output shaft 320 through a disconnect clutch 322, which corresponds to the clutch 190 of the embodiment of FIG. 3 or the clutch 190" in the embodiment of FIG. 9. Power output shaft 320 drives differential-and-axle assembly 324 for the rear traction wheels.

The arrangement of the motor, the generator and the gearing elements of the embodiment of FIG. 12 provides an alternative vehicle packaging arrangement for an automotive vehicle chassis environment.

The clutches shown in FIGS. 2-5, 7 and 9-12 are positive engagement clutches, such as dog clutches. In the alternative, synchronizer clutches or wet friction clutches could be used. Further, the clutches may be electrically actuated with electronic solenoid actuators or actuators that are actuated with hydraulic pressure. Such an alternative designs will reduce power losses and improve operating efficiency. The friction clutches of FIGS. 6 and 8 also can be replaced by such alternating designs that are actuated automatically by a transmission control module.

Although several embodiments of the invention have been disclosed, it will be apparent to persons skilled in the art that modifications may be made without departing from the scope of the invention. All such modifications and equivalents thereof are intended to be covered by the following claims.

What is claimed:

1. A hybrid electric vehicle powertrain comprising an engine, an electric motor, an electric generator, a battery and gearing defining power flow paths between the motor and vehicle traction wheels and between the engine and the vehicle traction wheels;

the gearing including a gear unit having at least one power input gear element, a power output gear element and a reaction gear element, the power input gear element being in the power flow path between the engine and first vehicle traction wheels, the power output gear element being connected drivably to the first vehicle traction wheels; and a clutch and brake assembly for establishing forward drive gearing ratios and one reverse drive gearing ratio in the gear unit;

the motor being mechanically connected to second vehicle traction wheels;

the generator, the motor and the battery being electrically coupled in the power flow path between the motor and the traction wheels;

the gearing further including a powersplit planetary gearset having one gearset element connected to the engine, a second gearset element connected to the generator and a third gearset element connected by the clutch and brake assembly to the at least one power input element of the gear unit.

2. The hybrid electric vehicle powertrain set forth in claim 1 wherein the gear unit is a compound planetary gear unit with two compound planetary gear unit power input elements;

the clutch and brake assembly having selectively engageable clutches for connecting separately and third gearset element to the two compound planetary gear unit power input element.

3. The hybrid electric vehicle powertrain set forth in claim 2 wherein the selectively engageable clutches are wet clutches with lubricated friction material on friction torque members of the wet clutches.

4. The hybrid electric vehicle powertrain set forth in claim 2 wherein the selectively engageable clutches are synchronizer clutches under the control of a transmission control module.

5. The hybrid electric vehicle powertrain set forth in claim 1 wherein the powersplit planetary gearset has a simple planetary gear arrangement with a sun gear, a ring gear, a carrier and planet pinions mounted on the carrier;

the second gearset element being the sun gear connected drivably to the generator;

the one gearset element being the carrier connected to at least the engine; and the third gearset element being the ring gear connected to the at least one power input gear element of the gear unit by the clutch and brake assembly.

6. The hybrid electric vehicle powertrain set forth in claim 2 wherein the powersplit planetary gearset has a simple planetary gear arrangement with a sun gear, a ring gear, a carrier and planet pinions mounted on the carrier;

the sun gear being connected drivably to the generator;

the engine being connected drivably to the carrier; and the ring gear being connected separately by the clutch and brake assembly to the two compound planetary gear unit power input elements.

7. The hybrid electric vehicle powertrain set forth in claim 1 wherein the third gearset element is adapted to be braked by the clutch and brake assembly whereby the engine drives the generator to charge the battery as the motor drives the vehicle traction wheels in a hybrid-series operating mode.

8. A hybrid electric powertrain for a vehicle having front and rear traction wheels comprising an engine, an electric motor, an electric generator, a battery and gearing defining power flow paths between the engine and a first power output shaft and between the motor and a second power output shaft the gearing including a gear unit and a powersplit planetary gearset, the gear unit comprising a power input gear element and a reaction gear element, the power input gear element being in a power flow path between the engine and the vehicle rear traction wheels, a power output element of the gear unit being connected drivably to the rear traction wheels through the first power output shaft; and a clutch and brake assembly for establishing two forward drive gearing ratios and one reverse drive gearing ratio in the power flow path for the engine;

the generator, the motor and the battery being electrically coupled by the planetary gearset in the power flow path between the motor and the front traction wheels through the second power output shaft the power flow path between the motor and the front traction wheels including a front wheel driveshaft extending in a direction offset from and parallel to an axis for the gearing;

the gear unit being a compound planetary gear unit with two compound planetary gear unit power input elements;

the clutch and brake assembly having selectively engageable clutches for connecting separately a gearset element to of the powersplit gearest to the two compound planetary gear unit power input elements.

9. The hybrid electric powertrain set forth in claim 8 wherein the selectively engageable clutches are wet clutches with lubricated friction material on friction torque members of the wet clutches.

10. The hybrid electric vehicle powertrain set forth in claim 8 wherein the selectively engageable clutches are synchronizer clutches under the control of a transmission control module.

11. The hybrid electric powertrain set forth in claim 8 wherein the powersplit planetary gearset has a simple planetary gear arrangement with a sun gear, a ring gear, a carrier and planet pinion mounted on the carrier;

the sun gear being connected drivably to the generator;
the engine being connected drivably to the carrier;
the ring gear being connected drivably to the power input gear element of the gear unit by the clutch and brake assembly.

12. The hybrid electric powertrain set forth in claim 8 wherein the powersplit planetary gearset has a simple planetary gear arrangement with a sun gear, a ring gear, a carriers and planet pinions mounted on the carrier;

the sun gear being connected drivably to the generator;
the engine being connected drivably to the carrier;
the ring gear being connected separately by the clutch and brake assembly to the two compound planetary gear unit power input elements.

13. The hybrid electric powertrain set forth in claim 11 wherein the gearset element is adapted to be braked by the clutch and brake assembly whereby the engine drives the generator to charge the battery as the motor drives the vehicle traction wheels in a hybrid-series operating mode.

14. A hybrid electric powertrain for a vehicle having front and rear traction wheels comprising an engine, an electric motor, an electric generator, a battery and gearing defining power flow paths between the engine and a first power output shaft and between the motor and a second power output shaft;

the gearing having at least one power input gear element and a reaction gear element, the power input element being in the power flow path between the engine and vehicle rear traction wheels, a power output element of the gearing being connected drivably to the rear traction wheels through the first power output shaft; and a clutch and brake assembly for establishing two forward drive gearing ratios and one reverse drive gearing ratio;

the motor being connected drivably to front traction wheels through the second power output shaft;

the generator, the motor and the battery being electrically coupled in the power flow path between the motor and front traction wheels;

the power flow paths between the engine and the rear traction wheels and between the motor and the front traction wheels are braking power delivery paths from the traction wheel whereby the motor acts as a generator and stores electrical energy in the battery; and a disconnect clutch in the braking power delivery path from the front traction wheels for disconnecting the rear traction wheels from the front traction wheels if braking power from the front traction wheels exceeds braking power from the rear traction wheels whereby skidding of the rear traction wheels is avoided during vehicle braking.

15. The hybrid electric vehicle powertrain set forth in claim 14 wherein the power flow path between the motor and the second power flow path includes a motor speed sensitive clutch between the motor and the front traction wheels whereby the speed sensitive clutch is disengaged to interrupt the power flow path between the motor and the first power output shaft if motor speed exceeds a pre-determined value.

16. The hybrid electric vehicle powertrain set forth in claim 8 wherein the generator is mounted on a generator axis that is transversely offset from and parallel to a motor axis.

17. The hybrid electric vehicle powertrain set forth in claim 8 wherein the motor is mounted on a motor axis that is transversely offset from and parallel to the second power output shaft.

* * * * *